United States Patent [19]

Scheffler et al.

[11] Patent Number: 4,859,545
[45] Date of Patent: Aug. 22, 1989

[54] CATHODE FLOW CONTROL FOR FUEL CELL POWER PLANT

[75] Inventors: Glenn W. Scheffler, Tolland; George Vartanian, Ellington, both of Conn.

[73] Assignee: International Fuel Cells Corporation, South Windsor, Conn.

[21] Appl. No.: 190,431

[22] Filed: May 5, 1988

[51] Int. Cl.$^4$ ............................................. H01M 8/04
[52] U.S. Cl. ........................................ 429/17; 429/23
[58] Field of Search .................... 429/13, 23, 17, 12

[56] References Cited

U.S. PATENT DOCUMENTS 4,202,933  5/1980  Reiser et al. ................ 429/12

FOREIGN PATENT DOCUMENTS 0133774  8/1983  Japan ...................... 429/13
0091568  5/1985  Japan ...................... 429/23

Primary Examiner—Donald L. Walton
Attorney, Agent, or Firm—William W. Jones; Edward L. Kochey, Jr.

[57] ABSTRACT

A system and method for regulating the total oxygen content entering the cathode side of a fuel cell stack at less than full power depends on measurement of: oxygen partial pressure in the cathode exhaust stream; total flow entering the cathode; and current produced by the stack. During partial power operation of the stack, it is desirable to limit the cathode potential, or voltage, by recycling cathode exhaust and mixing it with incoming fresh air fed into the cathodes. This system ensures that the total oxygen flow to the cathodes remains constant at any given current by reducing the amount of fresh air flowing to the cathodes as the recycled cathode exhaust flow is increased.

9 Claims, 1 Drawing Sheet

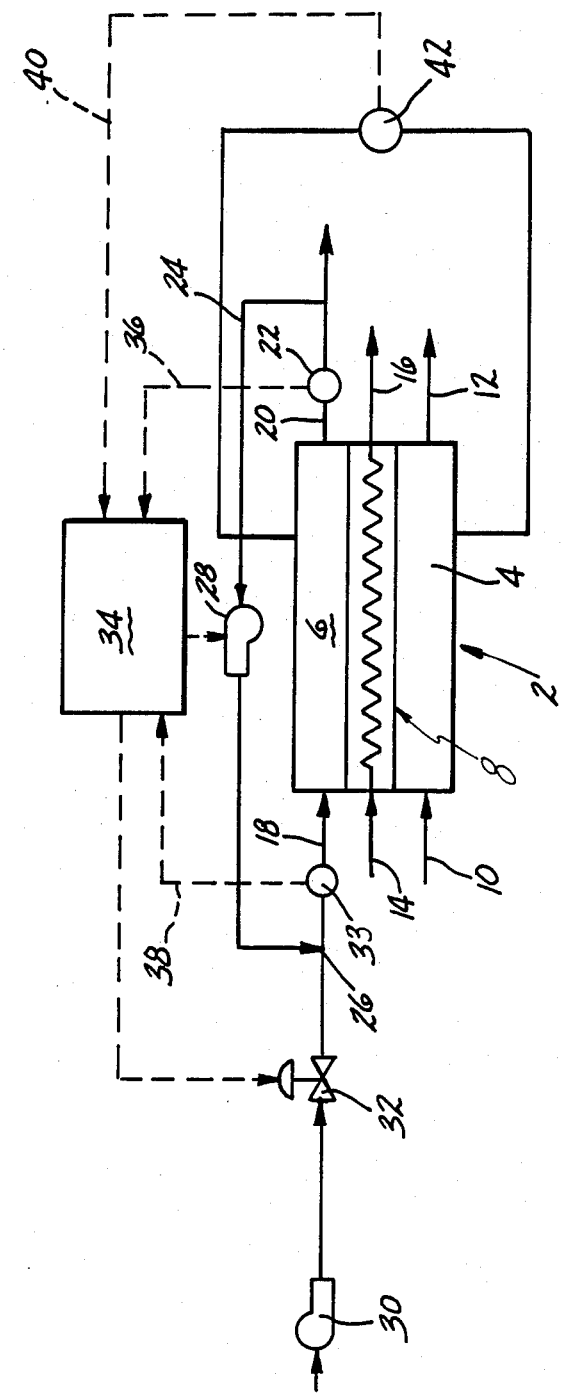

CATHODE FLOW CONTROL FOR FUEL CELL POWER PLANT

DESCRIPTION

1. Technical Field

This invention relates to a system and method for controlling the amount of oxygen flowing to the cathodes in a fuel cell stack when the stack is operating at partial power levels.

2. Background Art

U.S. Pat. No. 4,202,933 granted May 13, 1980 to C. A. Reiser et al discloses a system and method for reducing fuel cell output voltage to permit low power operation of a fuel cell stack. The patented system recycles the cathode exhaust stream back to the cathode inlet and also reduces the amount of fresh oxygen fed into the cathode by reducing the airflow to the cathode inlet. The adjustments are made by comparing the desired power output with the actual power output, with the incoming airflow being reduced until actual power is as close to desired power as possible. A sensor monitors the amount of fresh air flowing into the system. Thus, the patented system depends on current measurement and incoming airflow rate measurement for its operation. Use of the patented system can result in individual cell starvation because no measurement of the amounts of oxygen consumed in the stack are made. Additionally, the flow rate sensor measuring the airflow will be operating at the low end of its operable range due to airflow throttling, whereby the accuracy of the air flow rate sensor will be at its poorest. Cells which are starved for oxygen can break down to a degree which will adversely effect the performance of the entire stack.

DISCLOSURE OF INVENTION

The system and method of this invention will lessen or eliminate the incidence of cell starvation at partial loads because the amount of oxygen consumed in the stack is a factor which is used to control the feeding of oxygen to the stack. In the system of this invention, the total oxygen flow rate into the cathodes is measured by a sensor which is exposed to the combined cathode inlet stream, i.e., the mixture of gases formed after the recycled cathode exhaust is mixed with the incoming fresh air. This ensures that the sensor will not be subjected to the low air flow rates that it encounters in the 4,202,933 patent system. The accuracy of the sensor is thus increased. The more accurate measurement in air inlet flow, combined with the measurement of oxygen in the cathode exhaust, provides an accurate picture of the oxygen consumption in the stack, so that the incidence of individual cell starvation is minimized.

It is therefore an object of this invention to provide an improved fuel cell stack cathode air flow control system for use to lower cell voltage when the stack is operated at partial power levels.

It is a further object of this invention to provide a flow control system of the character described wherein total oxygen consumption in the stack is measured to guard against oxygen starvation of individual cells at lower power levels.

It is yet another object of this invention to provide a flow control system of the character described wherein total air flow rate into the stack is measured so as to ensure proper instrument operation with minimal error.

These and other objects and advantages of the invention will become more readily apparent from the following detailed description of a preferred embodiment thereof when taken in conjunction with the accompanying drawing which is a schematic representation of a fuel cell stack which employs the cathode flow control of this invention.

BEST MODE FOR CARRYING OUT THE INVENTION

Referring to the drawing, there is shown schematically a fuel cell power plant which employs the cathode feed system of this invention. The power plant includes a fuel cell stack 2 having an anode side 4, a cathode side 6, and a water cooling system 8. Hydrogen rich fuel gas enters the anode side 4 through anode inlet 10 and the hydrogen depleted exhaust leaves the anode side 4 through anode outlet 12. The water coolant enters the cooling system 8 through coolant inlet 14, and leaves the cooling system 8 as a two phase water/steam mixture through coolant outlet 16. The remainder of the fuel and coolant subsystems in the plant do not form a part of this invention, and thus are not disclosed herein. They may take conventional forms and include conventional components.

The oxygen-bearing gas, such as air, enters the cathode side 6 via cathode inlet 18 and exhaust from the cathode side 6 leaves through cathode exhaust line 20. A sensor 22 for monitoring the oxygen content of the cathode exhaust is disposed in the cathode exhaust line 20. A cathode exhaust recirculating loop 24 extends from the cathode exhaust line 20 to the cathode inlet 18, joining the cathode inlet line 18 at juncture 26. The cathode exhaust recirculating loop 24 is activated and modulated by a variable speed blower 28. The fresh air supply fed into the cathode inlet 18 is moved by a blower 30, and the amount of fresh air entering the cathode inlet line 18 is controlled by a modulating valve 32. An air flowmeter 34 is disposed in the cathode inlet line 18 between the cathode 6 and the cathode exhaust recycle juncture 26. The flowmeter 33 thus, in effect, measures the total oxygen flowing into the cathode 6, i.e., the amount contributed by the recycled cathode exhaust, plus the amount contributed by the air.

The system of the invention is operated by the power plant microprocessor control 34. The power plant control 34 receives a signal 36 from the cathode exhaust oxygen sensor, plus a signal 38 from the air inlet flow monitor 34, and also a signal 40 from a current output monitor 42 which measures the current load on the stack 2. With this data, the control 34 solves several previously inputted algorithms to determine the appropriate setting of the air inlet valve 32. Knowing the current I from the monitor 42, the control 34 calculates the oxygen molar consumption rates, $O_2CONS$, by solving the following equation based on Faraday's law:

$$O_2CONS = 2.06 \times 10^{-5} \cdot I$$

The control 34 then determines the actual oxygen utilization $UO_2$ for the existing current, by solving this equation:

$$UO_2 = \frac{O_2\ CONS}{O_2\ CONS + XO_2(Win + O_2CONS)}$$

Where $XO_2$ is the cathode exhaust oxygen concentration, which is derived from the sensor 22, and Win is the total inlet gas flow derived from the sensor 33. The control will have inputted therein valve settings for the valve 32 which correlate to desired $UO_2$ values at known currents, and will adjust the setting of the valve 32 to compensate for any differences between the desired $UO_2$ (which safeguards against individual cell starvation) and the measured $UO_2$. In this manner, the system constantly provides protection against individual fuel cell oxygen starvation when the plant is running at partial load levels.

It will be readily appreciated that the system and method of this invention will provide for more accurate instrument readings since the instrument for measuring incoming oxygen will not be required to operate at its lowest sensitivity levels. Additionally, since oxygen utilization in the stack is the key to ensuring that individual cells in the stack do not suffer from oxygen starvation, and the system is operable to measure oxygen utilization and adjust airflow to achieve optimum oxygen utilization for existing current output, the stack 2 is better protected against internal damage by the system of this invention.

Since many changes and variations of the disclosed embodiment of the invention may be made without departing from the inventive concept, it is not intended to limit the invention otherwise than as required by the appended claims.

What is claimed is:

1. A cathode air flow control system for use in a fuel cell power plant to minimize oxygen starvation of fuel cells in the power plant, said system comprising:
   (a) means forming a fresh air inlet for admitting air into the cathodes of the fuel cells in the power plant;
   (b) means in said fresh air inlet for varying the amount of fresh air admitted to said cathodes;
   (c) means forming an exhaust outlet for exhausting oxygen-depleted gas from said cathodes;
   (d) sensor means in said exhaust outlet for measuring the oxygen content of the oxygen-depleted gas therein;
   (e) means forming a recirculating loop for recirculating oxygen-depleted gas from said exhaust outlet to said air inlet;
   (f) monitoring means in said air inlet to measure the combined flow of incoming air and recirculated oxygen-depleted gas in said air inlet so as to effectively measure the total amount of flow conveying oxygen to the cathodes;
   (g) means for continuously measuring the electrical current output of the power plant; and
   (h) control means operably connected to said means for varying, to said sensor means, to said monitoring means, and to said means for continuously measuring, said control means being operable to calculate oxygen utilization in said cathodes and cause said means for varying to increase or decrease the amount of air in said air inlet in response to changes in the total measured oxygen utilization.

2. The system of claim 1 wherein said control means is a microprocessor which is preprogrammed to continuously calculate the optimum oxygen utilization for existing current output, and wherein said microprocessor is further operable to adjust said means for varying to compensate for differences between the optimum oxygen utilization and the total measured oxygen utilization to minimize differences therebetween.

3. A cathode air flow control system as in claim 1: said means forming a recirculating loop connected to said air inlet at a location between said means for varying the amount of fresh air admitted and the fuel cell.

4. A cathode air flow control system as in claim 1: said control means operable to calculate oxygen utilization based on the electric current, the oxygen content in said oxygen depleted gases, and the measured combined flow.

5. For use in a fuel cell power plant having a power section with a cathode inlet portion and a cathode exhaust portion, a method for minimizing the risk of oxygen starvation in individual cells in the power section during periods of operation thereof at partial current output, said method comprising the steps of:
   (a) providing a stream of fresh air for said cathode inlet portion;
   (b) providing from said power section a stream of oxygen-depleted exhaust air in said cathode exhaust portion;
   (c) continuously measuring the oxygen content of said exhaust air;
   (d) continuously measuring the current output of said power section;
   (e) circulating some of said exhaust air to said cathode inlet portion for admixture with said stream of fresh air to form a gas mixture for use in said power section cathodes during periods of partial load levels;
   (f) continuously measuring the flow rate of said gas mixture;
   (g) continuously calculating the oxygen utilization in the power section as a function of the measured current output, the measured flow rate of said gas mixture, and the measured oxygen content in the exhaust air;
   (h) comparing the calculated oxygen utilization with known-optimal oxygen utilization corresponding to the measured electrical current output values; and
   (i) varying the amount of air being admitted through said fresh air inlet so as to reduce noted differences between said calculated oxygen utilization and said optimal oxygen utilization.

6. The method of claim 3 including also:
increasing the amount of recirculated air as the current output decreases.

7. The method of claim 5 including also:
modulating the amount of recirculating air to limit the maximum voltage produced at low current outputs.

8. The method of claim 5 including also:
calculating the oxygen consumed as a function of the measured current output; and
calculating the oxygen utilization as a function of the oxygen consumed, the oxygen content of the exhaust air, and the flow rate of the gas mixture.

9. The method of claim 8 wherein:
the step of measuring the flow rate of the gas mixture comprises measuring said flow rate at the inlet to said cathode;
the step of calculating oxygen consumed in mols/hour comprises multiplying the measured current in amps by $2.06 \times 10^{-5}$; and
the oxygen utilization ($UO_2$) is calculated according to $$UO_2 = \frac{O_2 \text{ CONS}}{O_2 \text{ CONS} + XO_2(W_{in} + O_2 \text{CONS})}$$

where $O_2$ CONS is oxygen consumed, $XO_2$ is the fractional oxygen content of the exhaust air, $W_{in}$ is the measured flow entering the cathode expressed in consistent units.

* * * * *

UNITED STATES PATENT AND TRADEMARK OFFICE
CERTIFICATE OF CORRECTION

PATENT NO. : 4,859,545

DATED : August 22, 1989

INVENTOR(S) : Glenn W. Scheffler et al

It is certified that error appears in the above-identified patent and that said Letters Patent is hereby corrected as shown below:

Claim 1, Column 3, line 56: after "in the" delete "total".

Claim 2, Column 3, line 63: after "and the" delete "total.

Claim 6, Column 4, line 39: after "claim" delete "3" and insert --5--.

Signed and Sealed this

Thirtieth Day of June, 1992

*Attest:*

DOUGLAS B. COMER

*Attesting Officer*   *Acting Commissioner of Patents and Trademarks*